United States Patent [19]

Corvan et al.

[11] 4,423,203

[45] Dec. 27, 1983

[54] ELECTRICALLY PHOTOSENSITIVE POLYMERS CONTAINING VINYLENE-1,4-PHENYLENE-IMINO-1,4-PHENYLENE-VINYLENEARYLENE GROUPS

[75] Inventors: Peter J. Corvan; Jeanne E. Kaeding, both of Rochester, N.Y.; Cesar Rodriguez, Boston, Mass.; Norman G. Rule, Rochester, N.Y.

[73] Assignee: Eastman Kodak Company, Rochester, N.Y.

[21] Appl. No.: 409,800

[22] Filed: Aug. 20, 1982

[51] Int. Cl.$^3$ .............................................. C08G 12/04
[52] U.S. Cl. .................................... 528/266; 528/230; 528/247; 528/269; 204/159.21
[58] Field of Search ............... 528/230, 247, 266, 269; 204/159.21

[56] References Cited

U.S. PATENT DOCUMENTS

| | | | |
|---|---|---|---|
| 3,873,312 | 3/1975 | Contois et al. | 96/1.6 |
| 4,025,341 | 5/1977 | Rule | 528/266 X |
| 4,092,162 | 5/1978 | Wright et al. | 96/1.5 N |
| 4,360,660 | 11/1982 | Watarai et al. | 528/266 |

*Primary Examiner*—Lucille M. Phynes
*Attorney, Agent, or Firm*—Torger N. Dahl

[57] ABSTRACT

Disclosed are electrically photosensitive polymers in which recurring units contain vinylene-1,4-phenylene-imino-1,4-phenylene-vinylenearylene groups included in the polymer backbone. In one embodiment, the disclosed polymers are employed as the principal electrically photosensitive constituent in migration imaging dispersions and elements. In another embodiment, the polymers are employed as sensitizers for electrically photosensitive colorants having spectral absorption peaks in the 400–500 nm wavelength region of the spectrum. The polymers are employed in migration imaging dispersions and elements.

3 Claims, 1 Drawing Figure

ELECTRICALLY PHOTOSENSITIVE POLYMERS CONTAINING VINYLENE-1,4-PHENYLENE-IMINO-1,4-PHENYLENE-VINYLENEARYLENE GROUPS

This invention relates to an electrically photosensitive polymer containing vinylene-1,4-phenylene-imino-1,4-phenylene-vinylenearylene group recurring units. In particular, the invention relates to the use of vinylene-1,4-phenylene-imino-1,4-phenylene-vinylenearylene polymers in migration imaging as the principal electrically photosensitive component or in combination with another electrically photosensitive material to sensitize the latter and thereby increase its electrical photosensitivity.

In the past, there has been extensive description in the patent and other technical literature of photoelectrophoretic imaging processes, also known as migration imaging. Descriptions of migration imaging processes are contained in U.S. Pat. Nos. 2,758,939 by Sugarman issued Aug. 14, 1956; 2,940,847, 3,100,426, 3,140,175 and 3,143,508, all by Kaprelian; 3,384,564, 3,384,488 and 3,615,558, all by Tulagin et al; 3,384,566 by Clark; 3,383,993 by Yen; and 3,976,485 by Groner.

In each of the foregoing migration imaging processes, an imaging layer containing an electrically photosensitive dispersion is placed between two electrodes, subjected to the influence of an electric field and exposed to an image pattern of electromagnetic radiation to which the electrically photosensitive dispersion is sensitive. This causes electrically photosensitive particles in the dispersion to migrate imagewise in the layer to form a record of the imaging electromagnetic radiation.

Regardless of the particular migration imaging process employed, an essential component of any such process is the electrically photosensitive dispersion. Such dispersions are composed of a liquefiable, electrically insulating carrier containing electrically photosensitive particles which serve as the migrating components in a migration imaging process. The particles, in turn, contain pigment or dye compounds (herein referred to as colorants) which themselves are electrically photosensitive or form electrically photosensitive particles when combined with other photoactive components. In some instances, such colorants are also useful as sensitizers for other electrically photosensitive compounds.

Efforts continue, however, to find new electrically photosensitive compounds, particularly those which also can function as sensitizers for other electrically photosensitive materials, in particular for electrically photosensitive colorants which have a desired color or hue but which do not have a level of electrical photosensitivity as high as is desired.

The present invention provides novel electrically photosensitive polymers. The polymers are useful in electrically photosensitive dispersions as the principal electrically photosensitive component in migrating particles. Alternatively, the polymers serve as sensitizers for electrically photosensitive colorants having at least one major spectral absorption peak in the 400–500 nm wavelength region of the electromagnetic spectrum.

The polymers contemplated by the present invention include homopolymers or copolymers containing vinylene-1,4-phenylene-imino-1,4-phenylene-vinylenearylene recurring units. Preferred polymers containing vinylene-1,4-phenylene-imino-1,4-phenylenevinylenearylene groups are those having the following recurring units:

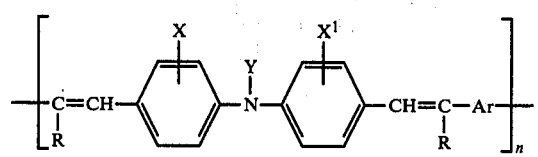

wherein:
R is independently hydrogen, cyano, alkyl of 1–5 carbon atoms, alkoxy of 1–5 carbon atoms, halo, aryloxy of 6–10 carbon atoms,

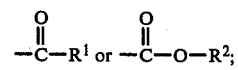

each of $R^1$, $R^2$ and Y is independently alkyl of 1–5 carbon atoms or aryl of 6–10 carbon atoms;
each of X and $X^1$ is independently hydrogen, cyano, alkyl of 1–5 carbon atoms, alkoxy of 1–5 carbon atoms, halo, aryloxy of 6–10 carbon atoms,

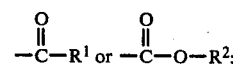

or X and $X^1$, taken together, represent a covalent bond;
Ar is arylene having 6–10 carbon atoms; and
n is about 10 to about 30.

Most preferred addition polymers are those having the recurring unit:

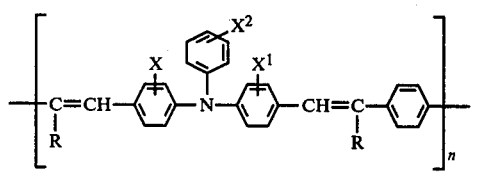

wherein:
R, X, $X^1$ and n are as previously defined and $X^2$ is selected from the same group of moieties defined for R.

Especially preferred are polymers having recurring units of structural formula II where each R is hydrogen; X and $X^1$ are each, independently, hydrogen or alkyl of 1–5 carbon atoms; and $X^2$ is hydrogen, alkyl of 1–5 carbon atoms or alkoxy of 1–5 carbon atoms.

Representative substituents include the following:

(A) alkyl: methyl, ethyl, propyl, butyl, amyl and substituted alkyl groups such as chloromethyl, trifluoromethyl, cyanoethyl, benzyl and phenoxyethyl
(B) alkoxy: methoxy, ethoxy, propoxy, butoxy, pentoxy and substituted alkoxy groups such as fluoromethoxy, cyanobutoxy and chlorophenylethoxy
(C) halo: chloro, iodo and bromo
(D) aryl or arylene: phenyl, naphthyl, phenylene, naphthylene and substituted aryl or arylene such as chlorophenyl, cyanophenyl, ethoxyphenylene and methylnaphthylene

BRIEF DESCRIPTION OF THE DRAWINGS

In the ensuing discussion relative to the present invention, reference will be made to FIG. 1 which illustrates an apparatus for migration-imaging.

As noted above, the electrically photosensitive polymers of the present invention comprise recurring units containing vinylene-1,4-phenylene-imino-1,4-phenylene-vinylenearylene groups. In these polymers, carbon-carbon, double-bond conjugation extends from the backbone nitrogen to each end of the recurring unit via a phenylenevinylene group on one side of the nitrogen atom and a phenylenevinylene group and arylene group on the other side of the nitrogen atom as shown. In this regard, the present inventors have evaluated structurally related monomers and polymers disclosed in U.S. Pat. Nos. 4,092,162 issued May 30, 1978, to H. E. Wright et al and 3,873,312 issued Mar. 25, 1975, to L. E. Contois et al. These related materials contain only single phenylenevinylene groups directly attached to a nitrogen atom, whereas the present polymers contain two phenylenevinylene groups attached to a nitrogen. The latter polymers effectively sensitized colorants, while the former polymers and compounds containing single phenylenevinylene groups did not.

Figure 1:
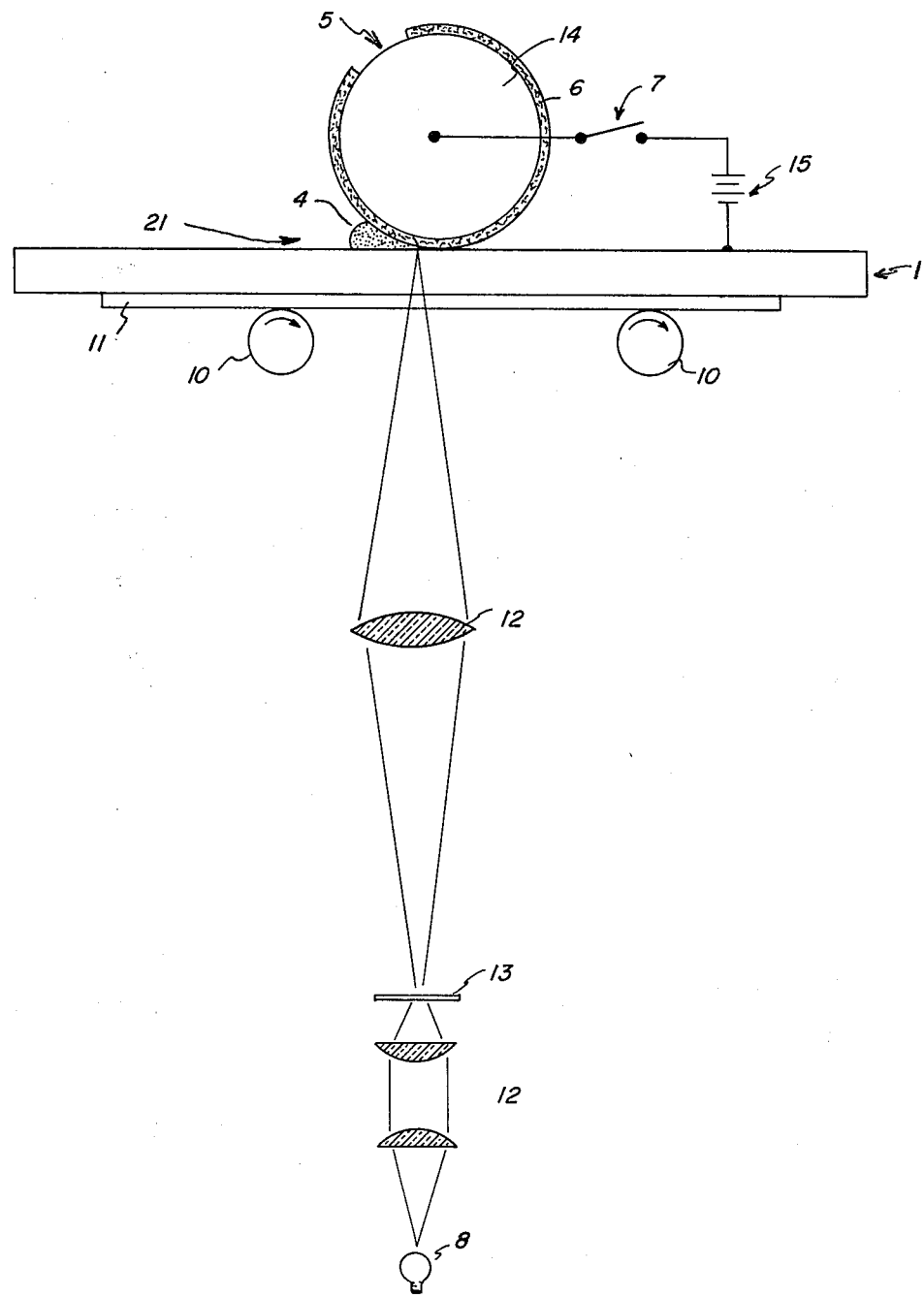

Preferred polymers in accordance with the present invention have a molecular-weight range of from about $5 \times 10^3$ to about $5 \times 10^4$.

The present polymers also exhibit major spectral absorption peaks from 400–500 nm, which may explain their ability to serve as chemical sensitizers for electrically photosensitive colorants having major absorption peaks in the 400–500 nm region as described below.

A partial, representative list of electrically insulating polymers encompassed by the present invention is shown in Table I.

TABLE I

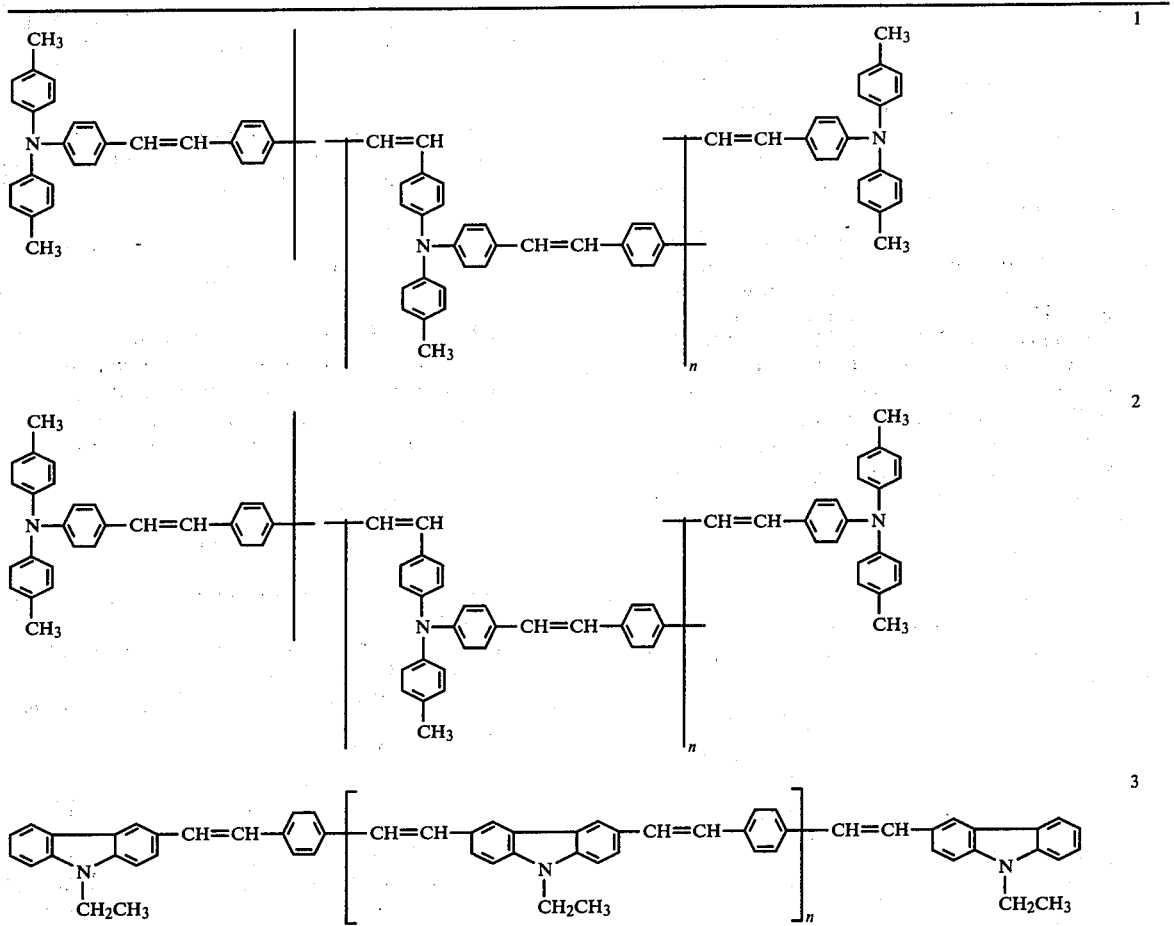

The polymers of the present invention are preferably employed in migration imaging. In this context, they are incorporated in a migration imaging dispersion comprising particles composed of the polymer dispersed in an electrically insulating liquefiable carrier. In such dispersions, they serve either as the principal electrically photosensitive component of such particles or as sensitizers for electrically photosensitive colorants having at least one major spectral absorption peak in the 400–500 nm wavelength region of the electromagnetic spectrum. As employed herein, the term "electrically photosensitive" refers to the ability of such particles, when subjected to actinic radiation and an electric field, to migrate within the dispersion to an electrode of a polarity to which they would not migrate when unexposed to actinic radiation.

As noted above, the present polymers can be employed as the principal constituent of an electrically photosensitive particle. In this mode of use, the concentration of the polymer within each particle extends up to 100 percent. The minimum concentration is that concentration below which the polymer in the particle no longer imparts appreciable electrical photosensitivity to the particles (i.e., the concentration below which the particle containing the polymer is no longer electrically photosensitive). Generally, however, a concentration as low as about 5 percent is useful.

Optional constituents within each particle containing the present polymers as the principal electrically photosensitive component include a colorant such as a pigment or a dye, whether or not the colorant is itself electrically photosensitive, as well as charge-control agents, leveling and coating aids, etc. Colorants include phthalocyanines, epindolidiones and quinacridones, as well as others such as those disclosed in allowed U.S. Pat. No. 4,322,487 by Merrill et al issued Mar. 30, 1982, the disclosure of which is incorporated herewith by reference.

In a preferred embodiment of the present invention, the vinylene-1,4-phenylene-imino-1,4-phenylene-vinylenearylene-containing polymers are employed as chemical sensitizers for certain electrically photosensitive colorants. The colorants have at least one major absorption peak in the 400–500 nm wavelength region of the electromagnetic spectrum. Most preferably, particles composed of the present polymer and such colorants also contain a charge-transport polymer, examples of which are disclosed below.

In the latter embodiment, the present polymer is employed in a sensitizing concentration, ordinarily much lower than the concentration employed when the polymer functions as the principal electrically photosensitive constituent. A useful concentration extends from about 2 percent by weight of the colorant to about 10 percent.

Electrically photosensitive colorants which are sensitized by the present polymers can be neutral, red, yellow or otherwise in color, provided that they have at least one major spectral absorption peak in the 400–500 nm wavelength region. Most preferably, epindolidiones, which are yellow in color and have absorption peaks closely resembling those of the present polymers, are employed. Such epindolidiones are unsubstituted or substituted with halogen and/or 1- to 3-carbon alkyl groups.

Alkyl-substituted epindolidiones include epindolidiones corresponding to the general structure:

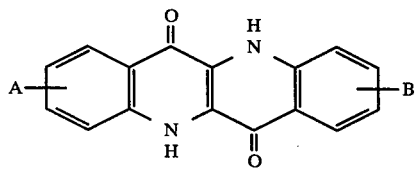

wherein A and B, taken independently, represent one or more alkyl substituents, preferably 1- to 3-carbon alkyl substituents such as methyl.

Useful methyl-substituted epindolidiones include meta-dimethylepindolidiones and tetramethyl epindolidiones as disclosed in *Research Disclosure*, Vol. 203, dated Mar. 10, 1981, Item 20305 (published by Industrial Opportunities Ltd., Homewell, Havant, Hampshire, P09 1EF, United Kingdom). A presently preferred epindolidione is 2,8-dimethyl epindolidione.

Other colorants which are usefully sensitized by the present polymers include the following. (Unlabeled atoms are carbon; $\phi$ is phenyl.)

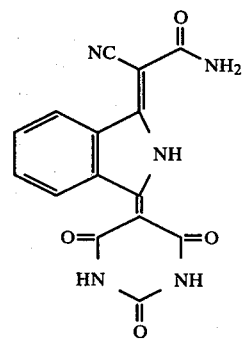

and those disclosed in U.S. Pat. No. 4,241,157, and

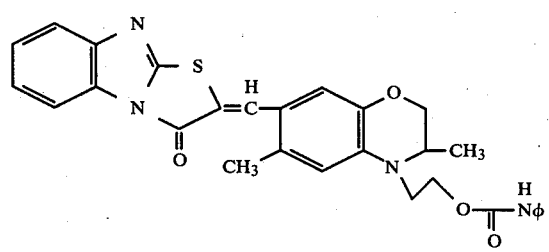

as disclosed in U.S. Pat. No. 4,304,908.

Sensitized colorant particles can also contain a charge-transport polymer, particularly a polymer which transports positive charges (holes) generated by one or more other constituents in the particles. Such polymers generally contain photoconductive groups such as arylamine, alkylbis(arylamine) or heterocyclic nitrogen groups. Preferred charge-transport polymers are those comprising repeating units derived from at least one class selected from the group consisting of triarylamines; p-aminotetraarylmethanes; 4,4'-bis(p-amino)triarylmethanes; 1,1-bis(p-aminoaryl)isobutanes; 1,1-bis(p-aminoaryl)cyclohexanes; N-alkyl-N,N-diarylamines; N,N-dialkylaryl-N-arylamines and heterocyclic nitrogen compounds having about 4–12 carbon atoms. Such preferred polymers are disclosed in U.S. Pat. No. 4,322,487.

The present vinylene-1,4-phenylene-imino-1,4-phenylene-vinylenearylene polymers are useful in migration imaging dispersion layers and processes which require the combined action of an electric field and exposure to an image pattern of electromagnetic radiation to obtain an image. The polymers are also useful in imaging processes such as those described in U.S. Pat. Nos. 3,520,681; 3,770,430; 3,795,195; 4,013,462; 3,707,368; 3,692,576 and 3,756,812; all relating to manifold imaging or photoelectrosolography.

In one migration-imaging process, an element is employed which includes a conductive support in electrical contact with a layer of a migration imaging dispersion as described above. The layer is uniformly electrostatically charged and then exposed to an image pattern of activating electromagnetic radiation. Electrically photosensitive particles in the imaging layer which have been exposed to radiation migrate through the imaging layer to form an undeveloped record of the image pattern on the conductive substrate. This image is solvent-developed to remove the exposed or the unexposed portions of the imaging layer.

In another process, a migration imaging dispersion layer positioned between two spaced electrodes is employed. While so positioned, the imaging layer is subjected to an electric field and exposed to an image pattern of activating radiation. As a consequence, the charge-bearing, electrically photosensitive particles in the imaging layer migrate to one or the other of the electrode surfaces to form on at least one of the electrodes a positive or negative image of the original image pattern. The image record is developed by separation of the electrodes. In this process, the migration imaging dispersion can be sandwiched between two support sheets to form an imaging element. After application of the field and exposure, a visual record of the image pattern is developed on at least one of the two sheets by separation of the sheets. The support sheets may be electrodes, or electrodes may be directly attached to the back surfaces of the support sheets. Alternatively, one or both of the support sheets may be made of a conductive material. In some embodiments, at least one of the sheets is transparent or translucent so as to permit exposure of the imaging layer.

In each of the foregoing processes, the carrier in the imaging dispersion is rendered sufficiently liquid to permit imagewise migration of the electrically photosensitive particles, under the combined influence of actinic radiation and an electric field.

In general, carrier liquefaction is provided by treatment with heat, a solvent and/or solvent vapors before, during or after the exposure to an image pattern of electromagnetic radiation and application of an electric field. It will be clear to those skilled in the migration imaging art that at least partial liquefaction of the electrically insulating carrier before or during the application of the field and exposure will achieve useful results. Good results are obtained if the carrier is liquefied after the exposure and field application steps. In the latter situation, the carrier is liquefied in the presence of a second electric field and the image is developed according to one of the techniques previously mentioned herein.

Generally, the migration imaging dispersions of this invention will contain from about 0.05 part to about 2.0 parts of electrically photosensitive particles for each 10 parts by weight of electrically insulating carrier.

Useful, liquefiable, electrically insulating carriers are disclosed in aforementioned U.S. Pat. Nos. 3,520,681; 3,975,195; 4,013,462; 3,707,368; 3,692,516; and 3,756,812. The carrier can be an electrically insulating liquid such as decane, paraffin, Sohio Odorless Solvent 3440 TM (a kerosene fraction marketed by the Standard Oil Company, Ohio); various isoparaffinic hydrocarbon liquids, such as those sold under the trademark Isopar G TM by Exxon Corporation and having a boiling point in the range of 145° C. to 186° C.; various halogenated hydrocarbons such as carbon tetrachloride or trichloromonofluoromethane; various alkylated aromatic hydrocarbon liquids such as the alkylated benzenes for example, xylenes, and other alkylated aromatic hydrocarbons such as are described in U.S. Pat. No. 2,899,335. An example of one such useful alkylated aromatic hydrocarbon liquid is Solvesso 100 TM sold by Exxon Corporation. Solvesso 100 TM has a boiling point in the range of about 157° C. to about 177° C. Typically, whether solid or liquid at normal room temperatures, i.e., at about 22° C., the electrically insulating carrier used in the present invention has a resistivity greater than about $10^9$ ohm-cm, preferably greater than about $10^{12}$ ohm-cm.

It is preferable to include a wax as a liquefiable carrier component. Waxes can be employed as the sole carrier constituent, or in combination with materials which dissolve in the wax above the melting point of the latter. Useful waxes include, for example, microcrystalline waxes, polyolefin waxes, long-chain petroleum waxes and paraffin waxes, as well as natural waxes including carnauba wax, beeswax and the like.

Other addenda which are optionally included in the imaging layer include polymeric and nonpolymeric charge-control agents; polysiloxane fluids, oils or elastomers; and various coating aids known to the art.

Migration imaging elements and a typical apparatus for carrying out a migration imaging process are described in copending U.S. patent application Ser. No. 295,454 filed Aug. 24, 1981, in the name of S. G. Link et al, entitled *Merocyanine-Cyanine-Merocyanine (MCM) Electrically Photosensitive Colorants.*

Preparation of Iminobis(1,4-phenylenevinylene)arylene Polymers

Polymers of the present invention can be prepared by an Emmons-Wittig reaction in which difunctional compounds are condensed by the reaction of carbonyl groups of one difunctional reactant with dialkylphosphonate groups of a second difunctional reactant in the presence of sodium methoxide and a benzaldehyde chain terminator. The Emmons-Wittig reaction is illustrated in *Some Methods of Organic Synthesis*, W. Carruthers, Cambridge University Press, 1971, page 85.

The following examples are provided to aid in the understanding of the present invention.

EXAMPLE 1

This illustrates the synthesis of Polymer I of Table I. $5.27 \times 10^{-2}$ moles of 4,4'-diformyl-4''-methyltriphenylamine, $6.57 \times 10^{-2}$ moles of tetraethyl p-phenylenedimethylenediphosphonate, $1.33 \times 10^{-2}$ moles of ditolylaminobenzaldehyde and 400 ml of dimethylformamide were mixed. With rapid stirring at 35° C., $22.2 \times 10^{-2}$ moles of NaOCH$_3$ were added to the mixture reactants over 30 minutes. Stirring was continued at room temperature for 1½ hours. The crude product was obtained by precipitation with ice and water, filtering, washing with water, and drying. The product was purified by dissolving it in methylene chloride, filtering hot, concentrating to a smaller volume, precipitating with methanol, and collecting the product by centrifugation.

EXAMPLE 2

This illustrates the preparation of Polymer 2 in Table I where 4,4'-diformyl-4''-methoxytriphenylamine replaced the corresponding formylated triphenylamine in Example 1. The reaction time employed was 48 hours.

Elements and Imaging Apparatus

Migration imaging dispersions containing the polymers from Examples 1 and 2 in combination with electrically insulating carriers and various other migration imaging addenda were formulated. Elements containing the dispersions comprised a layer of the dispersion on an electrically conducting, light-transmissive film substrate (hereinafter referred to as the donor). The donor, or injecting electrode as it is also referred to, was employed with a receiver composed of a dielectric layer on an electrically conducting film support releasably adhering to a cylindrical aluminum core.

The specific apparatus employed was a device of the type illustrated in FIG. 1. In this apparatus, a translating film base consisting of the donor with the dispersion side up served as electrode 1 and was in pressure contact with the blocking electrode (receiver), 6, on a 10-centimeter-diameter aluminum roller, 14. Electrode 1 was supported by 2.8-cm-diameter, rubber drive rollers, 10, positioned beneath electrode 1 such that a 2.5-cm separation existed. The light source, B, consisted of a Kodak Carousel Projector with a 1000-watt tungsten lamp. The light was modulated with a Kodak, No. 5, flexible, M-carbon, 0.3 neutral-density, 11-step tablet taped to the backside of electrode 1. The residence time in the action or exposure zone was 100 milliseconds. The voltage between the electrode 5 and electrode 1 was about 1 kv and the current was about 20 microamps. Electrode 1 was of negative polarity. The translational speed of electrode 1 was about 6 cm/second.

EXAMPLE 3

This illustrates the use of the polymers of the present invention as the principal electrically photosensitive particle component in a migration imaging dispersion.

The polymer of Example 1 was dissolved in methylene chloride and precipitated in Isopar G ™. The resultant particles were isolated by centrifugation, and redispersed with steel balls in a paint shaker in Isopar G ™ with the charge-control polymer poly(vinyltoluene-co-lauryl methacrylate-co-lithium methacrylate-co-methacrylic acid) 56/40/3.6/0.4 to form a migration imaging dispersion. The amount of each component in the dispersion was as follows Isopar G ™ : 24 grams particles: 1 gram
charge control polymer: 1 gram A donor was prepared by coating the resultant dispersion on a conductive film support, and the donor subjected to a migration imaging process in the described apparatus. The electrical photosensitivity of the particles in the dispersion yielded a negative image $D_{max}$ and $D_{min}$ of 2.15 and 0.08, respectively.

EXAMPLES 4-6

This illustrates the use of the polymers of the present invention as sensitizers for various electrically photosensitive colorants having at least one major spectral absorption peak in the 400–500 nm wavelength region.

Electrically photosensitive particles were prepared composed of 0.05 gram of Polymer I, Table I, per gram of colorant, and a dispersion of the particles coated onto a conductive support as in Example 3 to form a donor. The donors were imaged in the described apparatus, and the speed for each dispersion at 0.1 optical density (OD) above $D_{min}$ recorded. Relative sensitivity refers to electrical speed of a given dispersion relative to a control dispersion arbitrarily assigned a value of 100. Results are shown in Table II compared to a control dispersion in which the particles contained only colorant.

TABLE II

| Example | | Colorant | Binder | Relative Sensitivity |
|---|---|---|---|---|
| Control | 4 | | none | 100 |
| | 4 | 2,8-dimethylepindolidione | Polymer I | 1575 |
| Control | 5 | | none | 100 |
| | 5 | (structure) | Polymer I | 195 |
| Control | 6 | | none | 100 |
| | 6 | (structure) | Polymer I | 230 |

EXAMPLE 7

This further illustrates the use of the polymers of the present invention as chemical sensitizers for electrically photosensitive 2,8-dimethylepindolidione colorants in particles which also contain a charge transport polymer matrix.

Composite particles were formulated with 2,8-dimethylepindolidione (DME) as colorant, with and without Polymer I as sensitizer. Dispersions of the particles were coated to form donor films. The donor films containing the yellow particles were exposed to a blue light source and imaged.

Two types of DME composite particles were prepared. The composition of these particles, without the polymers of the present invention, was as follows:

| Particle A | |
|---|---|
| Component | Parts (by weight) |
| Pigment: 2,8-dimethylepindolidione | 1 |
| Charge transport polymer: poly(4-di-p-tolylaminostyrene) | 0.5 |
| Charge-control polymer | 0.5 |

| Particle B | |
|---|---|
| Component | Parts (by weight) |
| Pigment: 2,8-dimethylepindolidione | 1 |
| Charge transport polymer: poly(4-di-p-tolylaminostyrene-co-lauryl methacrylate-co-lithium methacrylate-co-methacrylic acid) 60/36/3.6/0.4 | 0.5 |
| Charge transport polymer: poly[4,4'-bis(N—ethyl-N—ethylene-amino)-2,2'-dimethyltriphenyl-methane-co-tetramethylene terephthalate-co-3,3'-sodioiminobis-(sulfonyl benzoate)]40/60/95/5 | 1 |
| Charge control polymer | 0.5 |

Particles A and B were also formulated with 0.05 part by weight of the polymer of Example 1.

Composite particles A and B were dispersed in Isopar G ™ in a concentration of 4 weight percent pigment based on the total weight of each dispersion. The dispersions were coated to form respective donor films as above and imaged with a blue light source. The results of such imaging in terms of relative sensitivity and negative image $D_{max}$ and $D_{min}$ are set forth in Table III.

TABLE III

| Particle | Parts Sensitizer (Example I Polymer) | Relative Sensitivity | Negative Dmax/Dmin |
|---|---|---|---|
| A | Control-None | 100* | 1.14/0.09 |
| A | .05 | 563 | 1.25/0.09 |
| B | Control-None | 100* | 1.25/0.08 |
| B | .05 | 398 | 1.36/0.08 |

*arbitrarily assigned a relative speed of 100 for each control case.

EXAMPLE 8

This illustrates the unsuccessful use of other polymers as sensitizers for migration imaging composite particles containing 2,8-dimethylepindoldione. The polymers evaluated are disclosed in U.S. Pat. No. 4,092,162 and differ from the polymers of the present invention in the following respect: The polymers contain only one phenylenevinylene group attached to an amine nitrogen. The polymers were characterized by the following structure:

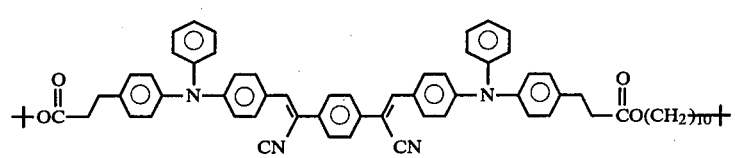

(A)

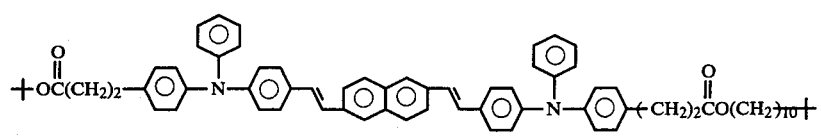

(B)

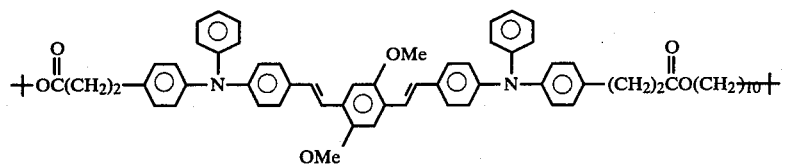

(C)

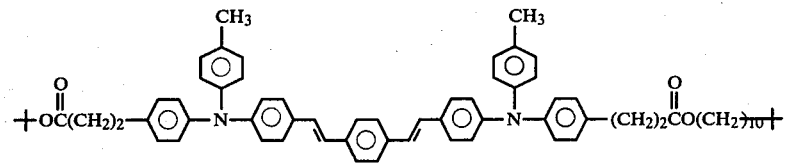

(D)

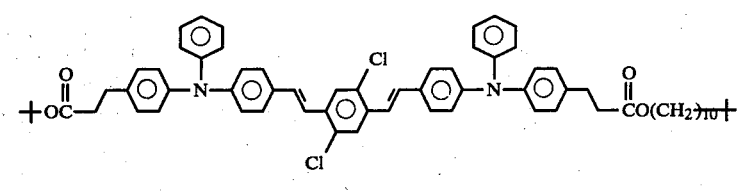

(E)

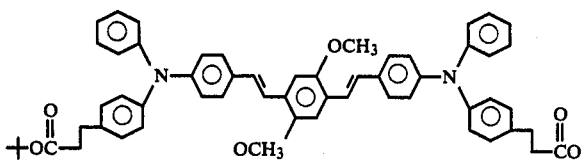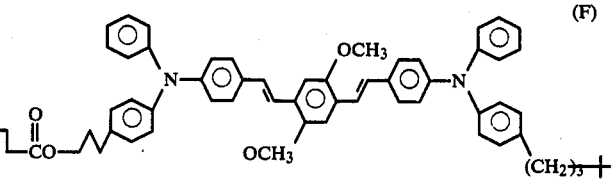

(F)

Relative to a control composite particle without the evaluated polymer, all the polymers evaluated exhibited decreased relative speed except Polymer B which exhibited a slightly increased relative speed of 137 compared with the control of 100. The polymers of the present invention, however, as seen from foregoing Examples 4–7, provide from 2 to 15 times increased speed relative to controls.

EXAMPLE 9

This illustrates the unsuccessful use of a polymer having recurring units of the following structure, as a sensitizer for a migration imaging dispersion of 2,8-dimethylepindolidione containing composite particles:

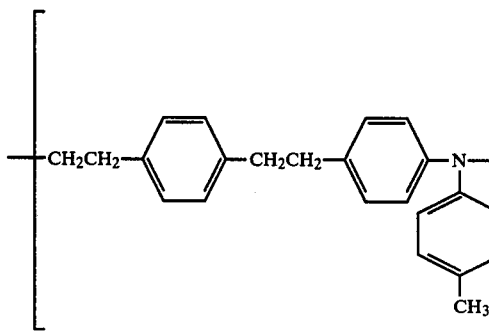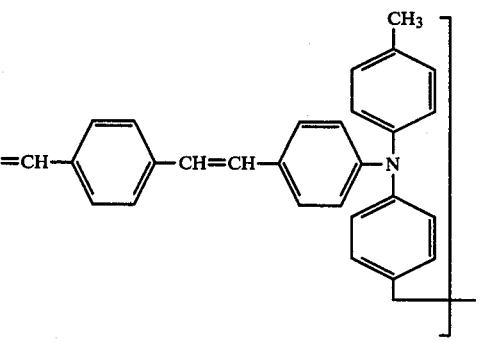

This polymer differs from the polymers of the present invention, particularly those conforming to structure II herein, in that the vinylene in one of the phenylenevinylene groups attached to the nitrogen atom has been saturated to an ethylene group, leaving only one remaining phenylenevinylene attached to the nitrogen atom.

The polymer evaluated did not increase the speed of its dispersion relative to the speed of a control dispersion containing no polymer.

EXAMPLE 10

This illustrates the unsuccessful use of a certain monomeric compound as a sensitizer for migration imaging composite particles containing 2,8-dimethylepindolidione. The compound evaluated, as well as other similar monomeric compounds, are disclosed in U.S. Pat. No. 3,873,312. The compound contains only one phenylenevinylene group attached to each nitrogen atom. The compound had the following structure:

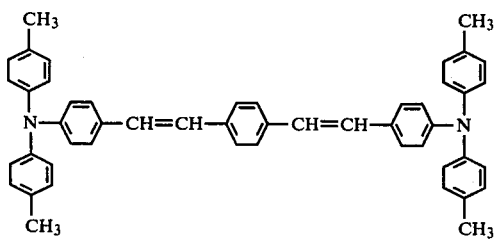

Relative to the sensitivy of a control dispersion containing the epindolidione composite particles without the evaluated compound and arbitrarily assigned a value of 100, the relative sensivity of a dispersion with composite particles containing the evaluated compound was 111.

The invention has been described in detail with particular reference to preferred embodiments thereof, but it will be understood that variations and modifications can be effected without the spirit and scope of the invention.

We claim:

1. An electrically photosensitive polymer in which recurring units comprise a vinylene-1,4-phenylene-imino-1,4-phenylene-vinylenearylene group.

2. The electrically photosensitive polymer of claim 1 wherein said recurring units are represented by the structure:

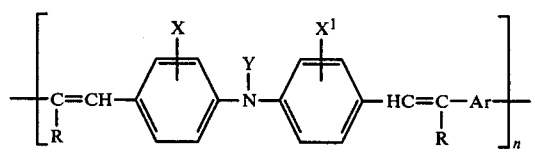

wherein:
R is independently hydrogen, cyano, alkyl of 1–5 carbon atoms, alkoxy of 1–5 carbon atoms, halogen, aryloxy, of 6–10 carbon atoms,

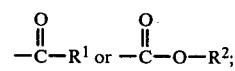

each of $R^1$, $R^2$ and Y is independently alkyl of 1–5 carbon atoms or aryl of 6–10 carbon atoms;
each of X and $X^1$ is independently hydrogen, cyano, alkyl of 1–5 carbon atoms, alkoxy of 1–5 carbon atoms, halogen or aryloxy of 6–10 carbon atoms; or X and $X^1$, taken together, represent a covalent bond;
Ar is arylene having 6–10 carbon atoms; and
n is about 10 to about 30.

3. An electrically photosensitive polymer as in claim 2 wherein Y is a phenyl group and Ar is a phenylene group.

* * * * *